Figure 1:
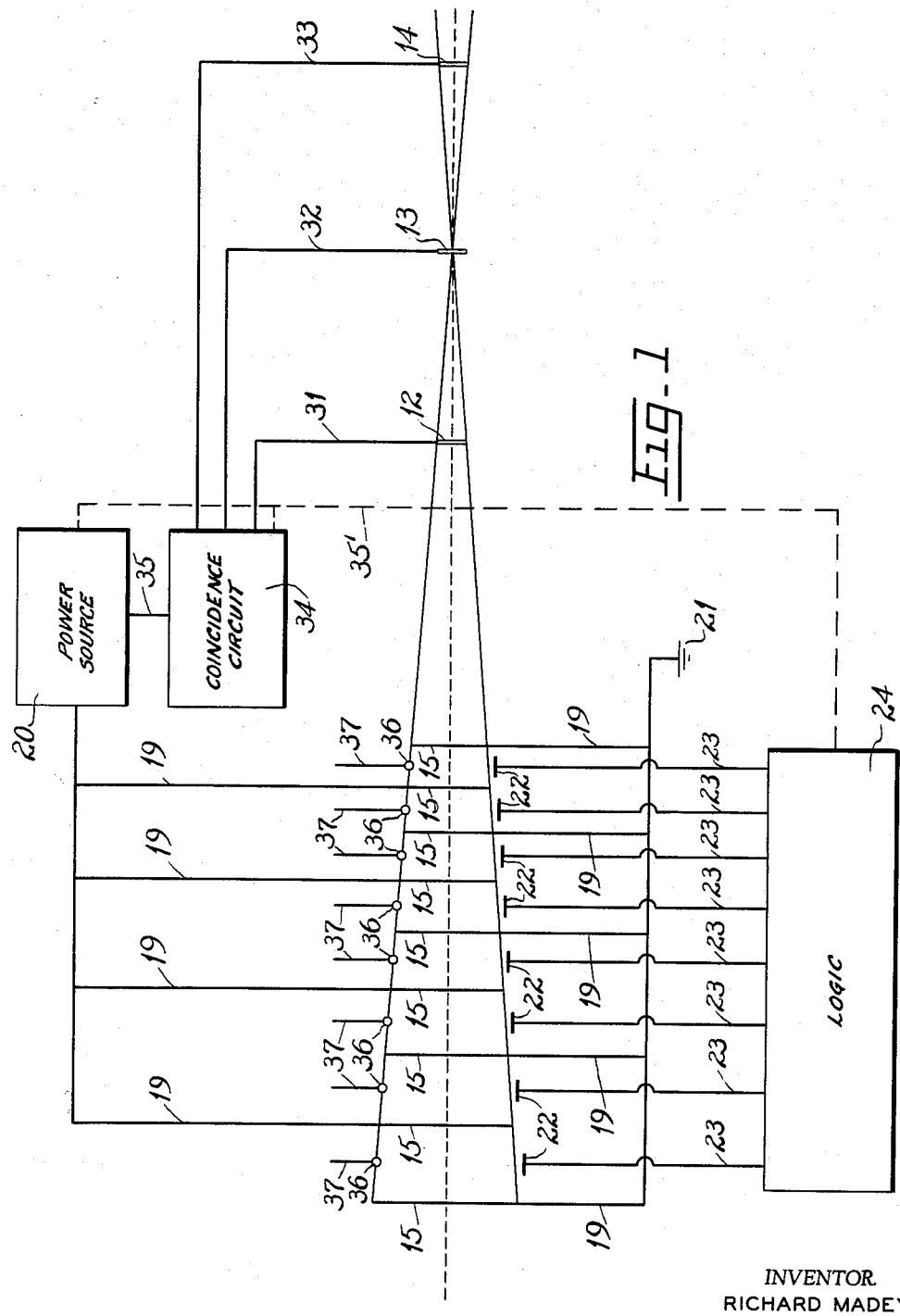

INVENTOR.
RICHARD MADEY

INVENTOR.
RICHARD MADEY

United States Patent Office 3,254,220
Patented May 31, 1966

3,254,220
ENERGETIC CHARGED PARTICLE DETECTOR
Richard Madey, Bellport, N.Y., assignor, by mesne assignments, to Fairchild Hiller Corporation, Hagerstown, Md., a corporation of Maryland
Filed Jan. 28, 1963, Ser. No. 254,132
13 Claims. (Cl. 250—83.6)

This invention relates broadly to detection and measuring devices and, more particularly, to a radiation detector for ascertaining the energy or range spectra of energetic charged particles. By "energetic charged particles" is meant particles with sufficient energy to penetrate matter.

The energy or range spectra of energetic charged particles consisting largely of electrons, protons and heavier nuclei have heretofore been measured by various detectors such as nuclear emulsions, Geiger counters, solid-state radiation detectors, scintillation counters, etc. Such prior detectors have been used in combination with absorbers, magnets, or pulse height analyzers in order to select a predetermined energy interval.

These prior art devices and techniques have certain limitations; for example, nuclear emulsions must be recovered in order to scan them for the information they contain. With lightweight systems that involve either absorbers or magnetic deflection, it is difficult to obtain good energy resolution over a wide spectral region. Solid-state detectors are not satisfactory for lightly ionizing particles because the signal level is comparatively small. Also solid-state detectors lack flexibility in design due to the fact that wafers commonly employed in these detectors are presently limited to small areas.

While it is not limited to, the present detector finds especial utility in, applications in outer space, i.e., outside the earth's atmosphere, inasmuch as it is adapted for construction as a miniaturized, self-contained unit of light weight, is capable of monitoring the time dependence of solar flare proton spectra, and has good resolution in energy, angle, and time. In addition, this detector is adapted for encapsulation whereby a ruggedized unit results that is capable of withstanding the high accelerations encountered in spacecraft launchings and relatively long service in the space environment.

It is, therefore, a purpose of the instant invention to produce a radiation detector of the type referred to above that is capable of determining the spectra of energetic charged particles in a selected environment in either space or atmosphere. Moreover, this proposed detector makes it possible to fabricate improved systems capable of providing information on the nature and distribution of energetic charged particles in the selected environment especially in outer space. Such systems have utility as radiation dosimeters employed to warn astronauts of the radiation hazards of space travel. Thus, the systems envisioned herein may be employed not only to provide continuous indication of the absorbed dose behind given amounts of matter including human tissue or shielding material but also a spectrometer system capable of continuous reconnaissance and data processing. For example, as a continuous monitor, such a system may be utilized to measure the time dependence of the intensity and energy distribution of protons from solar flares.

To the above ends, a detector is herein proposed that comprises an energy detection chamber formed by a series of counters, each separated by an insulating spacer, sealed or encapsulated in a gas atmosphere. These counters consist of parallelly disposed conducting plates alternate ones of which are connected to opposite sides of a high voltage pulser which produces a potential difference between each adjacent pair of plates.

When an energetic charged particle enters the detection chamber of the detector, it ionizes the gas therein along its path. The ionized track acts as a nucleus for the formation of a localized spark that jumps from plate to plate. A sensor responsive to the energy released by such sparks is associated with each space or gap between adjacent plates. These sensors are incorporated in an appropriate circuit whereby the energy thus sensed may be registered by associated equipment and/or telemetered to remote control stations. The number of plates penetrated by each passing particle indicates the energy level of that particle.

In order to measure the range or energy distribution of the charged particles, it is additionally contemplated that the thickness of the several plates may be varied. Moreover, by fabricating these plates of a tissue-equivalent material, such as, for example, a compound of carbon, hydrogen, nitrogen, and oxygen, each within a selected percentage range, the particles may be related to human tissue, and the biological dose and dose rates therefrom at various depths established.

Thus fabricated, the detector may be activated by connecting it to a pulsed high voltage source. This pulsed source may be free running whereby the detector is operative at preselected time intervals. Preferably, however, the voltage source is triggered at selected intervals by a self-actuating system sensitive to charged particles upon entering the detector whereby the plates are energized only during a short interval following actual particle movement into and through the detector. For this purpose, the detector includes a coincidence telescope disposed ahead of the detection chamber. This coincidence telescope and detector assembly has circuitry connecting it to the high voltage source whereby it not only limits the particles entering the detector to those in a selected path but also controls discharge or triggering of the source by the particles passing through the coincidence telescope.

It is contemplated that the several plates and insulating spacers comprising the present detector are bonded together into a unitary structure, for example, by a suitable adhesive in an inert gas atmosphere at a selected pressure. This bonded assembly is enclosed within an inert gas atmosphere and encapsulated in a dielectric.

Figure 2:
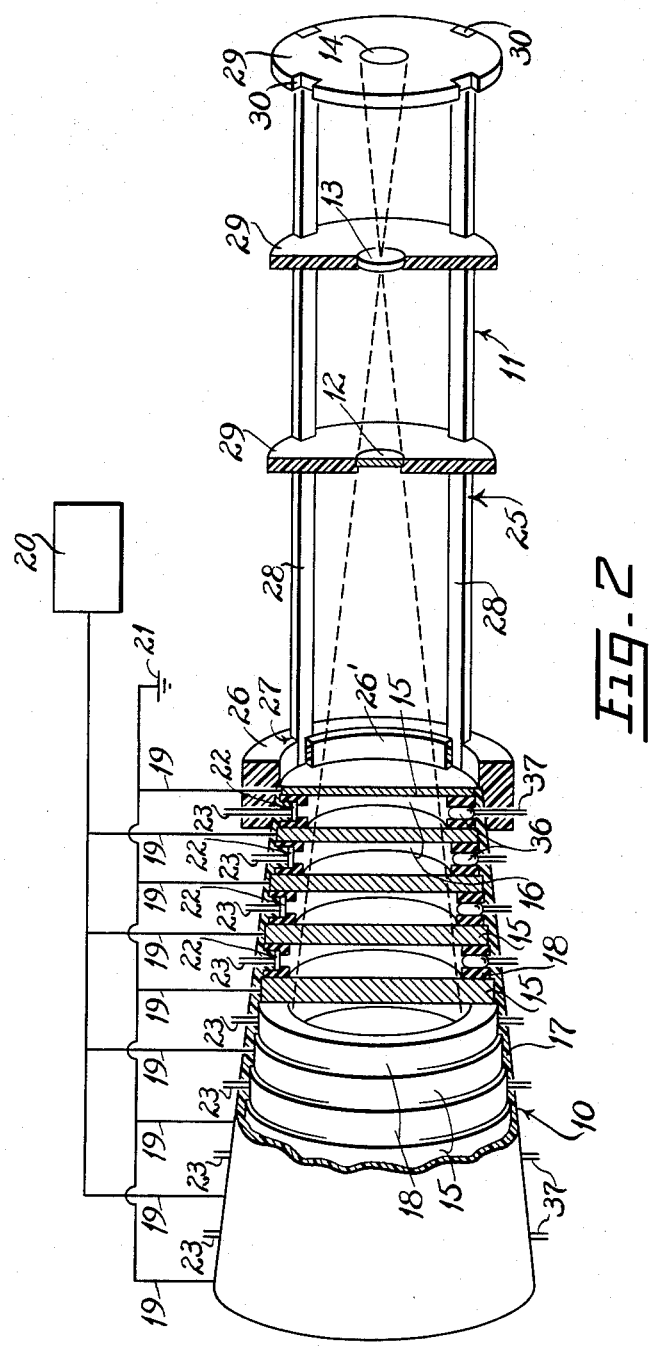

With the above and other objects in view, as will be apparent, this invention consists in the construction, combination and arrangement of parts, all as hereinafter more fully described, claimed and illustrated in the accompanying drawings, wherein:

FIG. 1 is a schematic view illustrating the application of a detector constructed in accordance with the teachings of this invention to a spectrometer system; and FIG. 2 is a perspective view of the detector employed in the system of FIG. 1 showing its coincidence telescope employed to selectively sample charged particles from an environment and to control the activation or energization of the detector, part of the detector and telescope elements being broken away to show a longitudinal section of the assembly.

Referring more specifically to the drawings illustrative of a preferred embodiment of the invention and a specific application thereof, 10 designates a radiation detector as herein proposed terminating at its forward end in a telescope 11 consisting of aligned coincidence detectors 12, 13 and 14. At its other end the detector 10 is formed by a plurality of conducting plates 15 of progressively greater transverse dimensions and thicknesses arranged in spaced relation one to the other as at 16. The several plates 15 are concentrically disposed about an axis to produce a generally truncated configuration. The spaces 16 between each pair of adjacent plates 15 constitute channels adapted to contain a gas atmosphere when the several plates 15 are bonded together in unitary assembly and encapsulated in a casing 17 of dielectric material, e.g., epoxy resin, so as to constitute an energy detector or spark chamber.

For purposes of illustration and explaining the invention, each of the plates 15 may be considered to be fabricated of metal, such as aluminum, copper, etc. However, a tissue-equivalent material such as, for example, a muscle blend comprising a compound of about 14% carbon, about 52% polyethylene, about 28% nylon, about 2% silica, and about 4% calcium fluoride, all by weight, may also be employed. Each space 16 is established and maintained by an annular electrical insulating spacer 18 disposed between adjacent plates. Where the plates 15 are fabricated of a tissue-equivalent material, they are preferably of electrically conductive material, on the other hand, if non-conductive, each plate 15 may be coated with a thin, conducting film to which an electrical conductor 19 is bonded in any known manner.

The several conductors 19 are appropriately connected in a circuit that includes a source 20 of pulsed, high-voltage and ground 21. Alternate plates 15 are connected by the conductors 19 to opposite ends of this circuit, i.e., one plate is connected to the voltage source 20 and the next adjacent plate to ground 21. The potential thus applied to the several plates 15 is normally less than that required to produce a spark discharge or current across the space or gap 16 between adjacent plates 15. Upon the entry of a charged particle to the detector 10, however, the gas in each channel 16 that it penetrates is ionized and a spark or arc is produced.

This spark releases energy in several forms, for example, light, electrical, mechanical, acoustic, etc., all of which are capable of detection by an appropriate sensor which, per se, is well known to the art. For the purposes of clarity and for a better understanding of the instant invention, this description will be in terms of light energy detection, it being understood that the invention contemplates the detection of energy generally.

Thus, each spacer 18 is fabricated of an electrically insulating material opaque to visible light, such as, for example, a ceramic or a cast epoxy resin loaded with a dielectric filler like mica. In order to increase the light collection efficiency, the inner surfaces of each spacer 18 and adjacent plates 15 that define each channel 16 may be lined or coated with an appropriate light reflecting material, such as, for example, magnesium oxide. The several spacers 18 are each adapted to mount a photodiode 22, to monitor the associated channel 16 and respond to a spark, if any, produced by a charged particle, as described. Photodiodes are suggested because of their adaptability to miniaturization since they may comprise relatively small silicon surface barrier diodes having a comparatively low power consumption, and a sensitivity in the ultraviolet and visible regions of the spectrum.

Since the thickness of each successive plate 15 of the detector 10 is greater, the detector acts to measure the range or energy spectrum of a given radiation in predetermined intervals which may be either uniform or varied. Each photodiode 22 is connected by a conductor 23 to an associated electronic logic circuit 24 whereby signals picked up by the photodiode are transmitted to the circuit 24 for coordination thereby and/or transmitted or telemetered to suitable control stations.

The coincidence detectors 12, 13 and 14 of the telescope 11 are disposed in front or ahead of the casing 17 with reference to the particle flow and in concentric alignment therewith. This position of the detectors 12, 13 and 14 is maintained by a spindle assembly 25 which is immovably mounted on and connected to the forward end of the casing 17 by means of a collar 26. To this end, the inner surface of the collar 26 has transverse dimensions corresponding to those of the associated end of the casing 17 which is snugly seated therein and bonded thereto. The collar 26 is provided with a plurality of localized recesses, as at 27 each adapted to receive and secure, as by bonding, a leg 28 of the spindle 25. A back-up ring 26' may be employed to facilitate this connection.

Each detector 12, 13 and 14 is appropriately mounted within a holder 29 disposed transversely of the spindle 25 between the several legs 28 thereof. At its edge each holder 29 is notched as at 30 for the passage of each leg 28 therethrough, the dimensions of the several notches 30 corresponding to their respective legs 28 whereby the several holders are secured in a selected relative position and, if desired, bonded.

By thus selectively locating the relative position of the several detectors 12, 13 and 14, as well as their distance from the forward end of the casing 17, the number of particles per unit time selected to enter the detection chamber of the detector 10 is controlled. This telescope geometry is designed to the particular environment to thereby minimize the number of unwanted trigger signals arising from chance coincidences between particles approaching the detectors 12, 13 and 14 from all directions. Such particles are not in the selected path under observation and constitute an accidental event so far as operation of the spectrometer is concerned.

In addition to the selective location of the detectors 12, 13 and 14 relative to each other and to the detection chamber within the casing 17 of the detector 10, the geometry of the detectors 12, 13 and 14, i.e., relatively small transverse dimensions in the order of ¼ inch practically exclude a particle from piercing only one of the detectors shortly after a different particle or particles has pierced the other detectors.

In order to reduce the power requirement when monitoring an occasional existence or flow of charged particles, for example, in a satellite equipped to monitor solar protons, a self-actuating circuit is employed. To this end, the coincidence detectors 12, 13 and 14 are operatively connected through individual conductors 31, 32 and 33, respectively, to the input of an energized coincidence triggering device 34 whereby particles piercing all of the detectors 12, 13 and 14 actuate the coincidence circuit 34. A signal is thereby transmitted through appropriate interconnecting circuitry 35' to energize the power supply 20 and the associated electronic logic 24. When signals are thus received by the device 34 from all detectors 12, 13 and 14, the device is actuated thereby to transmit a signal through a conductor 35 for operation or discharge of the source 20.

The detector 10 further includes energy-simulating means associated with each channel 16 to permit testing of the unit to insure its proper operation. Such simulating means is adapted to energize the sensor and, therefore, must be matched in terms of the type of energy it produces to that of the sensor. Simulating devices to produce the various types of energy released by the spark across channels 16 are known to the art. For clarity, therefore, this function and operation of the detector will continue in terms of light energy.

Each spacer 18 is adapted to mount a light source 36 disposed in opposition to the associated photodiode 22 for coaction therewith. Each light source 36 consists of a micro-miniature lamp which may include a built-in lens for focusing or concentrating the light when illuminated on the opposed diode 22. One such lamp suited for this purpose is manufactured and sold commercially under the trade name of "Pinlite" by the Kay Electric Company of Pine Brook, New Jersey. The several lights 36 are appropriately connected through leads 37 to a suitable power source (not shown) and individually operable to illuminate each channel 16 to thereby simulate a spark thereacross as effected by the passage of a charged particle.

What is claimed is:

1. A radiation detector comprising a plurality of adjacent, conducting plates electrically insulated and spaced one from another, a selected atmosphere filling the space between each pair of adjacent plates, a pulsed source of relatively high voltage connected to alternate plates, being connected to ground, said voltage being of a selected value to produce a current discharge between adjacent pairs of said plates upon the passage of an ionizing particle into the space defined thereby, and a sensor associated with each adjacent pair of said plates responsive to a current discharge therebetween.

2. The detector of claim 1 wherein the cross-sectional dimension of each successive plate is varied.

3. The detector of claim 1 wherein said plates have progressively greater transverse dimensions and are concentrically disposed about an axis to form a generally truncated configuration.

4. The detector of claim 1 including a telescope disposed in axial alignment with and in front of said plates.

5. The detector of claim 4 wherein said telescope comprises a plurality of coincidence detectors, and conductor means connecting said detectors to said voltage source whereby the ionizing particles piercing the several detectors discharge said source to energize the plates.

6. A radiation detector comprising a plurality of conducting plates disposed in spaced, parallel position, a gas within the space between each pair of successive plates adapted to be ionized by an energetic charged particle of predetermined magnitude in said space, a source of voltage of a selected value connected to each pair of adjacent plates and ground to produce a current discharge between said plates when the gas therebetween is ionized, and a sensor disposed between each said pair of adjacent plates responsive to a current discharge therebetween whereby the penetrating power of said particle is determined.

7. The detector of claim 6 wherein said plates are encapsulated in a casing of dielectric material.

8. The detector of claim 6 wherein each pair of adjacent plates are separated by an annular spacer fabricated of dielectric material.

9. The detector of claim 8 wherein the several plates and spacers are encapsulated in a dielectric material.

10. The detector of claim 9 wherein said sensor constitutes a photodiode embedded in each spacer and exposed to the space between the associated plates, and additional means in the form of a light source embedded in each spacer in opposition to each photodiode and operative to energize said photodiode thereby simulating a current discharge between the associated plates.

11. A radiation detector comprising a plurality of adjacent, conducting plates electrically insulated and spaced one from another, a selected atmosphere filling the space between each pair of adjacent plates, a source of relatively high voltage connected to alternate plates, a ground connection connected to the other plates, said voltage being of a selected value to produce a current discharge between adjacent pairs of said plates upon the passage of an energetic charged particle into the space aforesaid, and a photodiode electrically connected to associated equipment disposed between each adjacent pair of said plates and responsive to a current discharge therebetween.

12. A radiation detector comprising a plurality of adjacent, conducting plates electrically insulated and spaced one from another, a selected atmosphere filling the space between each pair of adjacent plates, a source of relatively high voltage connected to alternate plates, a ground connection connected to the other plates, said voltage being of a selected value to produce a current discharge between adjacent pairs of said plates upon the passage of an energetic charged particle into the space aforesaid, a sensor associated with each adjacent pair of said plates responsive to a current discharge therebetween, and means disposed adjacent each said sensor and operative to simulate a current discharge between the associated plates for actuation of said sensor.

13. A radiation detector comprising a plurality of adjacent, conducting plates electrically insulated and spaced one from another, a selected atmosphere filling the space between each pair of adjacent plates, a source of relatively high voltage connected to alternate plates, a ground connection connected to the other plates, said voltage being of a selected value to produce a current discharge between adjacent pairs of said plates upon the passage of an energetic charged particle into the space aforesaid, a photodiode electrically connected to associated equipment disposed between each adjacent pair of said plates and responsive to a current discharge therebetween, and a light source disposed adjacent each said photodiode and operable to energize it thereby simulating a current discharge between the associated plates.

References Cited by the Examiner

UNITED STATES PATENTS

| | | | |
|---|---|---|---|
| 2,595,622 | 5/1952 | Wiegand | 250—83.1 X |
| 2,741,709 | 4/1956 | Tirico et al. | 250—83.6 |
| 2,978,587 | 4/1961 | Forro | 250—71.5 X |

RALPH G. NILSON, *Primary Examiner.*

ARCHIE R. BORCHELT, *Examiner.*